United States Patent
Housel

(10) Patent No.: US 7,130,071 B2
(45) Date of Patent: Oct. 31, 2006

(54) PAGE AND SUBSET FEATURE SELECTION USER INTERFACE

(75) Inventor: Edward M. Housel, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 863 days.

(21) Appl. No.: 10/078,120

(22) Filed: Feb. 19, 2002

(65) Prior Publication Data
US 2002/0114003 A1    Aug. 22, 2002

(51) Int. Cl.
*G06F 3/12* (2006.01)
(52) U.S. Cl. .................................... 358/1.15
(58) Field of Classification Search ............. 358/1.15; 715/504, 508, 864
See application file for complete search history.

(56) References Cited

U.S. PATENT DOCUMENTS

| | | | | |
|---|---|---|---|---|
| 5,270,779 A | | 12/1993 | Kawai | ......................... 355/313 |
| 5,621,876 A | * | 4/1997 | Odam et al. | ................. 715/504 |
| 5,669,040 A | * | 9/1997 | Hisatake | ..................... 399/83 |
| 5,718,520 A | | 2/1998 | MacKay | ..................... 400/61 |
| 5,963,890 A | | 10/1999 | Sarbach | |
| 5,999,911 A | | 12/1999 | Berg et al. | ...................... 705/9 |
| 6,115,044 A | * | 9/2000 | Alimpich et al. | ........... 715/855 |
| 6,128,017 A | | 10/2000 | Alimpich | |
| 6,134,568 A | | 10/2000 | Tonkin | ........................ 707/526 |
| 6,173,295 B1 | | 1/2001 | Goertz et al. | ................ 707/505 |
| 6,181,436 B1 | | 1/2001 | Kurachi | ..................... 358/1.15 |
| 6,539,181 B1 | * | 3/2003 | Hull | ............................ 399/19 |
| 6,894,792 B1 | * | 5/2005 | Abe | .......................... 358/1.15 |
| 6,914,687 B1 | * | 7/2005 | Hosoda et al. | ............... 358/1.1 |
| 2002/0105663 A1 | * | 8/2002 | Pappalardo et al. | ....... 358/1.12 |

FOREIGN PATENT DOCUMENTS

EP        0 400 620 A2    12/1990

OTHER PUBLICATIONS

International Search Report PCT/US02/04832.
PCT International Search Report, mailing date Aug. 29, 2002 (3 pages).

* cited by examiner

*Primary Examiner*—Mark Zimmerman
*Assistant Examiner*—Jacob P. Rohwer
(74) *Attorney, Agent, or Firm*—Justin D. Petruzzellz

(57) ABSTRACT

An improved interface for use with a digital printer is presented. The interface utilizes information held by the raster imaging processor to allow an operator quick access to information about the print features of a print job and the ability to easily and quickly alter those print feature if necessary.

9 Claims, 3 Drawing Sheets

FIG. 3

Plex a=Simplex | b=Duplex | c=Tumble | z=noChange

OutTray a=top | b=stacker | c=stapler | d=Top | e=Stacker | f=Stapler | z=noChange Subset a=start | z=noChange Staple a=None | b=Both | c=Top | d=Bottom | e=Saddle | z=noChange Jog a=Straight | b=Alternate | z=noChange Slip a=media[1]simplex | b=media[2]simplex | c=media[3] | d=media[1]duplex | e=media[2] |
f=media[3]duplex | g=simplex | h=duplex | z=noChange Insert a=media[4] | b=media[5] | c=media[6] | d=media[7]postFuser | z=noChange onSide a=forceFront | b=forceBack | z=noChange EraseOn a=Region[1] | b=Region[2] | c=Region[3] | z=noChange Shift a=Shift[1] | b=Shift[2] | c=Shift[3] | z=noChange GRET a=On | b=Off | c=on | d=off | z=noChange ToneCurve a=light | b=Light | c=dark | d=Dark | z=noChange Rotate a=0 | b=90 | c=180 | d=270 | z=noChange Trim a=On | b=Off | z=noChange Fold a=None | b=Saddle | c=Zfold | z=noChange PostProcess a=Feature1 | b=Feature2 | c=Feature3 | z=noChange FullBleed a=On | b=Off | c=on | d=off | z=noChange

PAGE AND SUBSET FEATURE SELECTION USER INTERFACE

FIELD OF INVENTION

The present invention relates generally to the field of digital imaging. More particularly, it relates digital imaging for the purpose of printing documents and images and apparatus and methods for improving the efficiency of such printing. Specifically the present invention relates to the field of user interfaces employed on digital printers and the information displayed thereon.

BACKGROUND OF THE INVENTION

Digital printers are in common use today for many production processes ranging from printing of a single document to large scale production of multiple documents. When running a print job the machine operates under a number of features associated with the job. Features include things like stapling, plex (i.e. simplex or duplex), output tray designation, media source, and rotate. Historically, these features were set at the job level. In other words, the entire job ran under the same features. However, the more recent digital machines enable the user to define features at a page level. With the newer machines the features can change in the middle of the job without the need for operator action. For example, the machine can be set up to start in a simplex mode (one sided copying) and midway through the job switch to a duplex mode (two sided copying) and then perhaps back to simplex again. Thus, a print job can not only have multiple features associated with it, but also those feature can vary depending on where in the print job you are.

One of the shortfalls of the present systems is that the operator does not have easy access to the features associated with a job. There are several reasons why the operator may want to have such access. Initially, it may be necessary to change the feature while the job is running. Without easy access to features it may not be practical to change the features. In addition, from a quality control standpoint it is advantageous for the operator to have easy access to the features of the job. With easy and continuous access to the status of the features the operator can assure that the job is running correctly. For example, if the pages should be two sided, the operator can assure that two sided documents are being generated. Moreover, such access can also assist in the smooth running of the job since the operator can assure that the appropriate media and or finishing set up is available.

Thus, there is a need for a user interface on digital printers that allows the operator easy access to the features of a print job on page by page or subset basis. In addition, there is a need for a user interface where the operator can view all the features of a print job at once and in a coordinated fashion. At the same time there is a need to conserve screen space on a user interface, to allow all features to be displayed and avoid abnormally large interfaces.

Therefore, it is an object of the invention of the invention to provide a digital printer with a user interface that provides an operator fast and easy access to page by page feature information for a print job.

It is a further object of the present invention that invention that optionally provide the operator with the ability to alter the print job feature through a user interface associated with a digital printer.

It is yet another object of this invention to optionally provide a user interface that allows the operator to scroll ahead to determine what feature of a print job are defined for future pages.

It is still another object of the present invention to provide a great deal of information on a display in a manner that the operator can easily scan to see what processes the print job should actually be performing.

SUMMARY OF THE INVENTION

In the present invention methods and apparatus are provided to enhance the ability and the efficiency of monitoring and adjusting features of a print job when those features are defined on a page by page basis. This generates a large amount of data that may be useful during a print job. The present invention provides a user interface associated with a digital printer that displays this data, i.e., the features of the print job. The user interface of the present invention is video screen. The feature information is displayed on the screen in a table format.

In one aspect of the invention the rows of the table represent the pages and the columns of the table represent the features. In each column there is an indication of how that feature is employed, if at all, on the particular page. The columns also include a visual indication of how the feature is implemented for a particular page, such as a color code. Advantageously, the present invention also allows the columns and rows to be minimized and thereby conserve screen space and view all the particular features at once These and other aspects of the invention will become more evident in the detail description of the invention below.

BRIEF DESCRIPTION OF THE DRAWINGS

FIG. 3 is an exemplary list of codes that may be used in conjunction with print features in the present invention.

DETAILED DESCRIPTION OF PREFERRED EMBODIMENTS

Figure 1:
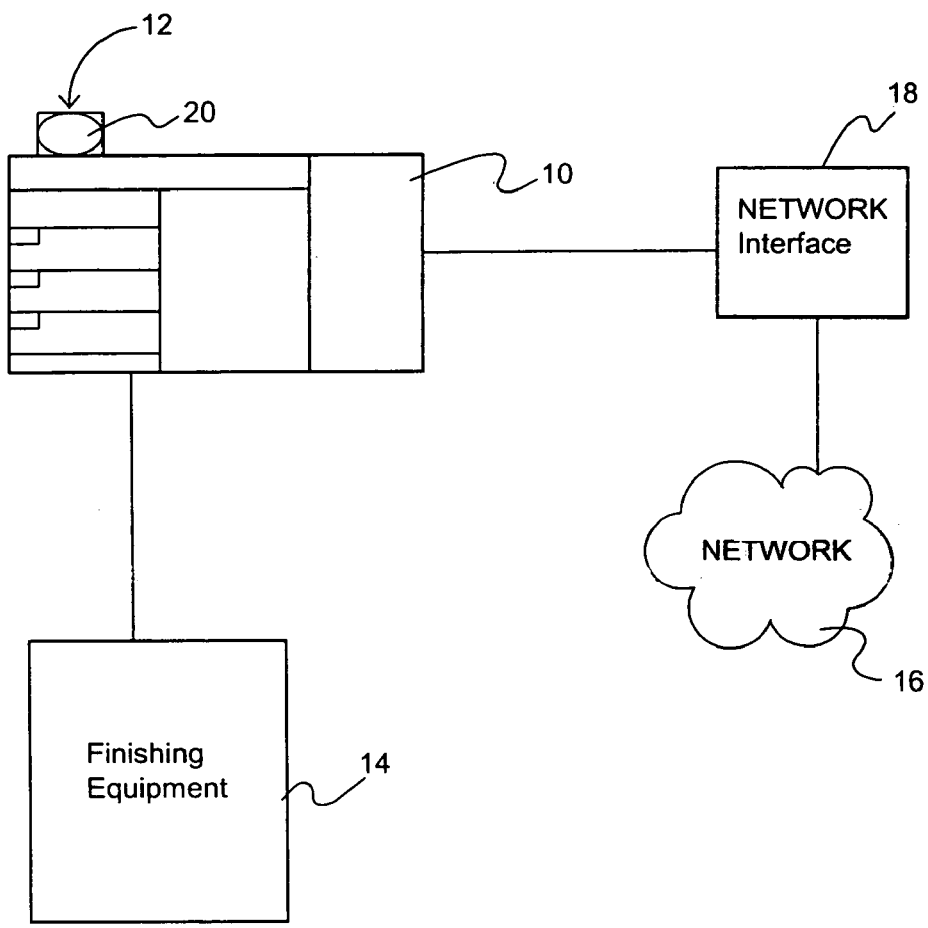
FIG. 1 depicts a typical layout for a digital printing system.

The present invention relates to a user interface for use with a printing system. FIG. 1 illustrates a typical system. The system includes a printer 10, a user interface 12, and potentially finishing equipment 14. The printer 10 is set up to receive a print job. Generally, the print job will be transmitted from a network 16 via a network interface 18. In the case of a stand alone printer the print job may be loaded locally or input through an associated scanner. In either case, the print job will have features associated with it. These features define how the print job is to be processed. The features could be part of the print job as it is received by the printer or they can be added to the job locally using the interface 12.

In one embodiment, the interface 12 includes a monitor 20. The monitor can be of any appropriate configuration. Specifically, it can be monochrome or color, it can be a CRT, a LCD flat screen, an LED display or the like. Moreover, the monitor 20 can be remote from the printer 10 or it can be integral to the printer 10. The interface 12 also includes a mechanism to input and alter the features of the print job. Such mechanisms are well know and include a keyboard, a mouse, a touch pad or a digitizer laid over the monitor 20 making it a touch screen. The interface 12 is not restricted to one such mechanism and could include several. For example, the interface could include a keyboard, a mouse and a touch screen.

Figure 2:
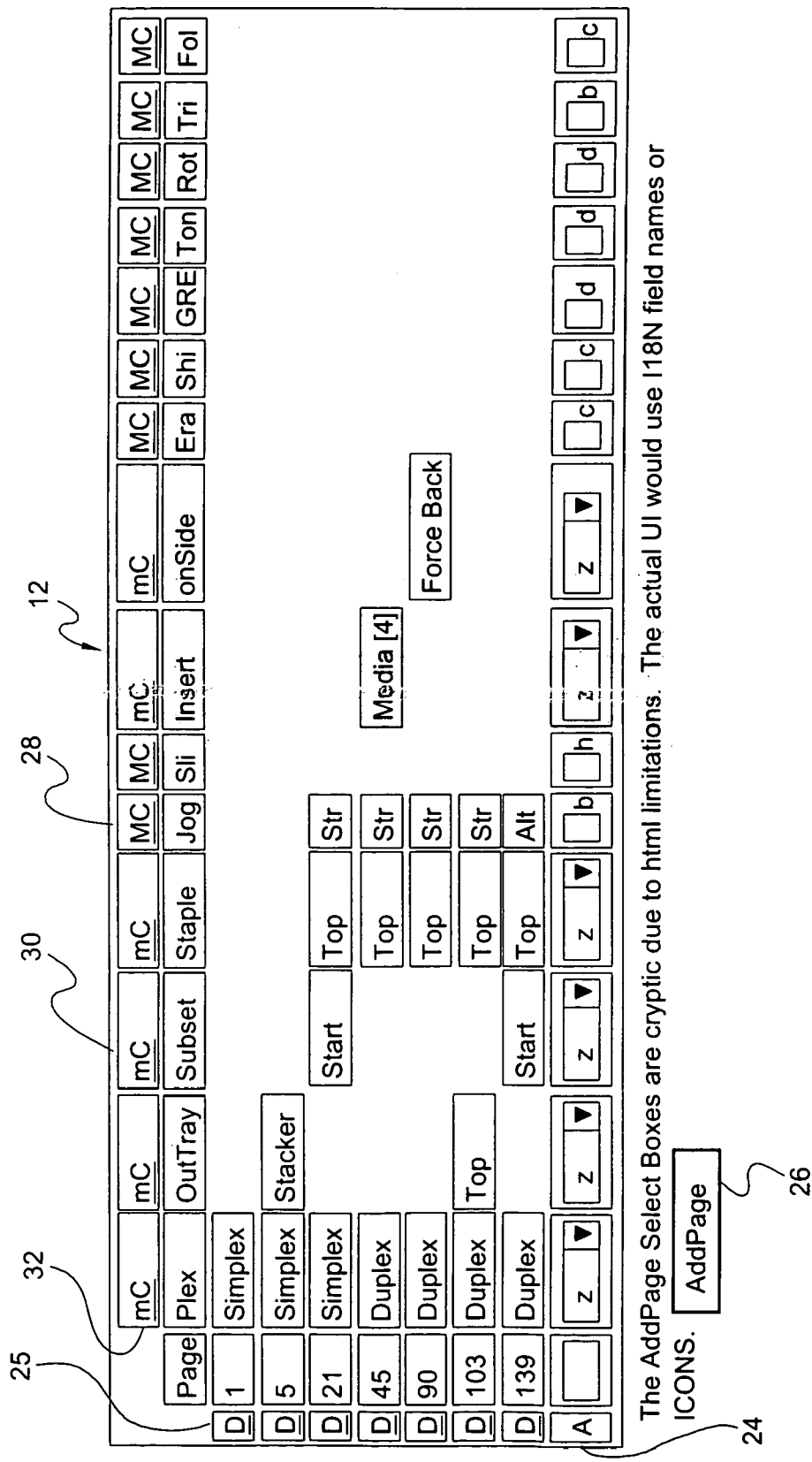
FIG. 2 depicts an exemplary example of the interface display of the present invention.

The interface 12 is configured to display the features of the print job. FIG. 2 is one embodiment of such a display. As illustrated in FIG. 2 the interface 12 is displayed in a column/row format. Generally, each column is directed to a feature and each row is directed to a page or group of pages. The embodiment shown in FIG. 2 only the pages where a change in the features occurs are displayed. The invention is not limited to such a display. For example, instead of single pages where changes occur the interface 12 may display groups of pages or every page and not vary from the invention.

There are two types of features: (1) job features that apply to the entire print job and/or act as a default setting; and (2) page features that apply to single pages or groups of pages within the print job. The features that will be included in the interface 12 will vary from printer to printer. The nature of the features is not a limiting aspect of the present invention as it can be used with any feature a printer can provide. Job level features may include information like: Creator, Routing, Title, BodyMedia, CompileOnly, PamphletMode, SheetsPerPamphlet, ChargeNumber, Covers, Email, TrailerMedia, MismatchBlock, PageSize, PrintRange, ProofSet, Collate, NumCopies, JobPlex, JobStaple, JobJog, JobTrim, Separator, TranparencyMode, and TransparencyMedia. Page level features include such printer functionality as Subset, Staple, OutTray, Jog, Plex, Slip, Inserts, onSide, Rotate, Trim, Fold, PostProcess, NoPrint, Shift, GRET, ToneCurve and EraseOn.

With the interface of the present invention an operator can determine what the status of a feature is at any place in the print job by looking down the column associated with that particular feature. Similarly, by looking across a row associated with any page, an operator can determine very quickly what features are in effect for a given page. The status of each feature is indicated on the screen. In one embodiment, the box 22 in the column is color coded or shaded to indicate the status of the feature on that page. For example, if the box 22 is colored red it may mean that the feature is in effect for only the indicated page, while if the box 22 is colored blue it may indicate that the feature is in place for all subsequent pages until a change is indicated.

The box 22 may also contain information indicating the setting of the particular feature. Many of the features have multiple potential settings so this information can be very useful. Examples of various potential settings are shown in FIG. 3. In one embodiment, each stetting is provided with a code. The code is a shorthand method for the operator to enter or change the settings.

Changing and entering features is simplified with the present invention. To add a new feature, initially the page the feature is added to must be entered. In one embodiment, shown in FIG. 2., if it is a new page, it can be added in the "A" line 24. The page number is entered in the page column either through a keyboard, keypad, drop menu, or other appropriate method. The features associated with that page are then entered in the appropriate column. In the embodiment described above the feature would be entered by selecting the appropriate code either through a drop menu or keypad. Once the features are set the "AddPage" box 26 is clicked on (with a cursor) or touched (with a touch screen) to enter the features into the print job. In another embodiment, the feature for a new page can be entered on a separate table. Once the features are defined an "Add Pages" or "submit" button is pushed and the features are transferred from the separate table to the main table displaying the features of the job.

Similarly, features can be changed or deleted. To delete the features on the existing page it is only necessary to click on (with a cursor) or touch (on a touch screen) the "D" box 25. If all the features relating to the page are not to be deleted, then it is only necessary to alter the code associated with the features to be changed on that page. Preferably, the interface 12 is set up to avoid inadvertent alterations and deletions. So in one embodiment before deletions and alterations are finalized a screen will appear on the interface screen asking the operator to confirm the change.

Another aspect of one embodiment of the present invention is that the columns have two states: an expanded state and a minimized state. In the expanded state, the column associated with a feature is bigger and the information relating to that feature is displayed. In the minimized state the column is smaller and less information is displayed. Examples of minimized column 28 and expanded columns 30 are shown in FIG. 2. The manipulation of the column size allows the system to conserve screen space and can allow for use of a smaller monitor. FIG. 2 illustrates a mechanism for switching the columns between expanded and minimized mode. The top row 32 in the display has either an "MC" (minimized column) icon or an "mC" icon (expanded column) associated with each feature column. A column can be switched between the two states by simply clicking on the icon, it will change to the other icon and the state of the column will similarly change, i.e. it will switch between an expanded state and a minimized state.

The interface 12 of the present invention would still allow the operator to set the job level features. In one embodiment the job level feature are displayed on the top of the interface screen in a scrollable format. The operator can then click on which job level features are appropriate and set them for the entire job. Typically, however, absent some action by the operator the job level features will be set at default settings. What the appropriate default settings are will vary from printer to printer and the printing environment in which they are used.

The information displayed on the interface originates from the RIP. As the RIP receives a print job it analyzes the data associated with the job. As this analysis identifies features or changes in features in the job, the RIP builds a file that tracks the features and/or the change in the feature. The interface then organizes the data in the file and displays it in the form discussed above. In addition, the file containing the feature data is updated and augmented by features added or changed through the interface.

Through the invention the operator has access to a very large number of page and job events and/or features. The interface gives the operator great flexibility when setting up a job in a way that will result in fewer errors. The use of color to convey information furthers the ease of access by the operator. Beyond job set-up the present interface also allows for easy and rapid modification of the job setting after initial set-up. As such this interface represents a significant advance over the state of the art.

It should be understood that the illustrated embodiments are exemplary only and should not be taken as limiting the scope of the present invention. For example, the invention can be used with various protocols and is not limited to the protocols detailed herein. The claims should not be read as limited to the order or elements unless stated to that effect.

Therefore, all embodiments that come within the scope and spirit of the following claims and equivalents thereto are claimed as the invention.

I claim:

1. A user interface configured to manage print jobs, the user interface communicatively connected to a printer configured to print the print jobs, the user interface comprising:
    a display device on which page-level print features associated with groups of pages of a single print job are displayed in a table structure wherein a first axis of the table structure represents a plurality of page-level print features along the axis, and a second axis of the table structure represents the groups of pages of the single print job; and
    an input device configured to interact with the table structure that allows the inputting of new and alteration of existing page-level print features for the single print job.

2. The user interface of claim 1, wherein the display device is formed integrally with the printer.

3. The user interface of claim 1, wherein the display device utilizes color to denote a state of a page-level print feature.

4. The user interface of claim 1, wherein each group of pages must be associated with a different set of page-level print features.

5. The user interface of claim 1, wherein the groups of pages are represented along the second axis in an order in which the groups of pages appear in the single print job.

6. A computer-implemented method of managing a print job, the method comprising the steps of:
    displaying, on a display, a plurality of page-level print features associated with a plurality of groups of pages of a single print job, the plurality of page-level print features being displayed along a first axis of a table structure;
    displaying, on the display, the plurality of groups of pages of the single print job along a second axis of the table structure, wherein a cell in the table structure identifies a page-level print feature of the plurality of page-level print features associated with a group of pages of the plurality of groups of pages of the single print job;
    receiving input from a user interface interacting with a portion of the table structure; and
    modifying one of the plurality of page-level print features associated with one of the plurality of groups of pages of the single print job in response to the input.

7. The method of claim 6, wherein the display utilizes color to denote a state of a page-level print feature of the plurality of page-level print features.

8. The method of claim 6, wherein each group of the plurality of groups of pages must be associated with a different set of page-level print features of the plurality of page-level features.

9. The method of claim 6, wherein the plurality of groups of pages are represented along the second axis in an order in which the groups of pages appear in the single print job.

* * * * *

UNITED STATES PATENT AND TRADEMARK OFFICE
CERTIFICATE OF CORRECTION

PATENT NO. : 7,130,071 B2 Page 1 of 1
APPLICATION NO. : 10/078120
DATED : October 31, 2006
INVENTOR(S) : Edward M. H It is certified that error appears in the above-identified patent and that said Letters Patent is hereby corrected as shown below:

Col. 5, Claim 1, line 12 Please add --first-- between "the" and "axis,"

Signed and Sealed this

Tenth Day of April, 2007

JON W. DUDAS
*Director of the United States Patent and Trademark Office*